(12) United States Patent
Woll

(10) Patent No.: US 11,517,927 B2
(45) Date of Patent: Dec. 6, 2022

(54) PAINTING SYSTEM

(71) Applicant: Bernhard Woll, Erdmannhausen (DE)

(72) Inventor: Bernhard Woll, Erdmannhausen (DE)

( * ) Notice: Subject to any disclaimer, the term of this patent is extended or adjusted under 35 U.S.C. 154(b) by 335 days.

(21) Appl. No.: 16/633,485

(22) PCT Filed: Jul. 23, 2018

(86) PCT No.: PCT/EP2018/069938
§ 371 (c)(1),
(2) Date: Jan. 23, 2020

(87) PCT Pub. No.: WO2019/020574
PCT Pub. Date: Jan. 31, 2019

(65) Prior Publication Data
US 2021/0078028 A1    Mar. 18, 2021

(30) Foreign Application Priority Data

Jul. 24, 2017 (EP) ..................... 17182861

(51) Int. Cl.
*B05B 13/00* (2006.01)
*B05B 1/28* (2006.01)
(Continued)

(52) U.S. Cl.
CPC .............. *B05B 13/005* (2013.01); *B05B 1/28* (2013.01); *B05B 12/084* (2013.01);
(Continued)

(58) Field of Classification Search
CPC .......... B64C 2201/12; B64C 2201/027; B64C 39/027; B05B 13/005
See application file for complete search history.

(56) References Cited

U.S. PATENT DOCUMENTS 11,235,890 B1 * 2/2022 Dahlstrom ............. B64D 47/08
2015/0274294 A1   10/2015 Dahlstrom
(Continued)

FOREIGN PATENT DOCUMENTS

DE    102013101194 A1    8/2014
DE    102014116821 A1    5/2016
(Continued)

OTHER PUBLICATIONS

International Search Report issued in corresponding International Application No. PCT/EP2018/069938 with English translation dated Sep. 10, 2018 (7 pages).
Written Opinion of International Searching Authority issued in corresponding International Application No. PCT/EP2018/069938 dated Sep. 10, 2018 (8 pages).

*Primary Examiner* — Richard G Davis
(74) *Attorney, Agent, or Firm* — Flynn Thiel, P.C.

(57) ABSTRACT

A coating system for applying coating liquid such as a base coat, a paint, a lacquer or a protective layer to surfaces of buildings, wind turbines, ships and aircraft. The coating system includes an unmanned aerial machine in the form of a helicopter for dispensing the coating liquid. The aerial machine has a fuselage, two rotors, a tank for holding the coating liquid, and an applicator for dispensing the coating liquid and outputting same onto a surface to be coated. In order to supply the tank with coating liquid, the tank is fastened to the aerial vehicle and the tank or aerial vehicle has a filling opening for refilling the tank in the landed state of the vehicle, and/or the tank is part of an exchangeable tank module coupled to the fuselage and/or is uncoupled from the fuselage by a coupling device controlled in an automated manner.

29 Claims, 8 Drawing Sheets

(51) Int. Cl.
  *B05B 12/08* (2006.01)
  *B64C 39/02* (2006.01)
  *B64D 1/18* (2006.01)
  *B64D 37/16* (2006.01)
  *B64D 41/00* (2006.01)
  *B64D 47/08* (2006.01)
  *B64F 1/36* (2017.01)

(52) U.S. Cl.
  CPC ............. *B64C 39/024* (2013.01); *B64D 1/18* (2013.01); *B64D 37/16* (2013.01); *B64D 41/00* (2013.01); *B64D 47/08* (2013.01); *B64F 1/36* (2013.01); *B64C 2201/027* (2013.01); *B64C 2201/044* (2013.01); *B64C 2201/108* (2013.01); *B64C 2201/12* (2013.01)

(56) References Cited

U.S. PATENT DOCUMENTS

| | | | |
|---|---|---|---|
| 2016/0082460 A1 | 3/2016 | McMaster et al. | |
| 2016/0364989 A1 | 12/2016 | Speasl et al. | |
| 2017/0259920 A1* | 9/2017 | Lai | B64C 39/024 |
| 2019/0366375 A1* | 12/2019 | Thompson | B64C 39/02 |
| 2020/0002000 A1* | 1/2020 | Dahlstrom | B05B 9/0403 |

FOREIGN PATENT DOCUMENTS

| | | |
|---|---|---|
| DE | 102015110466 A1 | 1/2017 |
| ES | 1185483 U | 6/2017 |
| WO | 2015162613 A1 | 10/2015 |

* cited by examiner

PAINTING SYSTEM

FIELD OF APPLICATION AND PRIOR ART

The invention relates to a coating system, in particular for applying a base coat, a paint, a lacquer or a protective layer to surfaces which are to be coated. This coating system is, in particular, a coating system for coating surfaces of buildings, wind turbines, ships and aircraft.

Coating, in particular painting, large structures is generally extremely challenging in practice. Regions which cannot be reached from the ground usually require scaffolding or other types of special working platforms so that a coating can be applied from there. It is correspondingly complicated and expensive to repaint, for example, hulls of ships or fuselages of aircraft.

In addition to aesthetic aspects, the need to apply a coating and, in particular, also the need to regularly renew or to repair an existing coating arises for technical reasons. For example, in the case of wind turbines, a surface which is damaged and therefore in need of repair can considerably reduce the efficiency of said wind turbines, and therefore recoating is sometimes required at short notice in this case.

Problem and Solution

The object of the invention is to provide a coating system which allows coating of large and/or difficult-to-access surfaces with a low level of expenditure.

According to a first variant of the invention, a coating system which has the following features is proposed for this purpose.

The coating system has, in a known way, a tank for holding coating liquid before it is discharged and also has an applicator for dispensing the coating liquid, through which applicator coating liquid which is supplied from the tank is output onto a surface which is to be coated. For the purpose of dispensing liquid which is intended to be dispensed at a temperature above the ambient temperature, the tank can be designed as a thermally insulated tank.

The applicator is usually designed for dispensing the liquid which is supplied from the tank, that is to say a base coat liquid, a liquid paint or lacquer or another liquid, which is provided for the purpose of forming layers, in the form of a possibly atomized jet, optionally with the addition of air. A pumping device is usually provided for conveying the liquid from the tank to the applicator. As an alternative, a pressure accumulator containing a pressure medium can be provided, which pressure medium presses the liquid from the tank to the applicator and through said applicator to the surrounding area. The applicator has a dispensing opening through which the coating liquid is output to the surrounding area, wherein the applicator is preferably dimensioned and arranged relative to the fuselage in such a way that the dispensing opening and/or the above-described guide device of the applicator and/or a guide device of the applicator are at least partially spaced apart from the rotors by at least 20 cm with respect to a horizontal plane. As a result, the aerial vehicle can maintain a sufficient distance from the surface which is to be coated and nevertheless guide the applicator close to the surface, without the risk of collision becoming too high as a result.

Said aerial vehicle is configured in the form of a helicopter, that is to say with rotor blades which directly produce the lift, wherein at least two rotors are provided. Said aerial vehicle is preferably an aerial vehicle having more than two rotors since aerial vehicles of this kind, which are also called drones or multicopters, with three or more rotors are usually suitable for ensuring a high degree of positional stability by corresponding control. This is already achieved with an aerial vehicle having four rotors (quadrocopter) which rotate in opposite directions in pairs. However, on account of the high load capacity and the redundancy which can be achieved as a result, a design of the aerial vehicle with six rotors (hexacopter) or eight rotors (octocopter) is preferred.

The aerial vehicle is fitted with both the applicator and the tank and optionally also further necessary components for conveying the liquid to the applicator. Furthermore, the aerial vehicle comprises, in the generally known manner, the motors for driving the rotors and also the energy which is provided for driving said motors and an attitude controller which is implemented in a control computer.

It goes without saying that an aerial vehicle of this kind as part of a coating system easily reaches regions which would otherwise require a work platform, which requires a considerable amount of expenditure for fitting, and possibly corresponding scaffolding to manually guide an applicator. The low amount of expenditure leads to potentially significant lower costs. Furthermore, various hazards which accompany handling and use of scaffolding for the purpose of applying a coating are also dispensed with.

In terms of controlling the aerial vehicle, this can be performed by means of remote control which is performed manually by an aerial vehicle controller who is on the ground. However, autonomous or partially autonomous control by an autopilot system which, given existing data about the area to be coated, defines the flight route itself is preferred. The aerial vehicle is preferably in permanent radio connection with a base station, and therefore the autopilot system does not, or does not completely, have to be formed by the control computer of the aerial vehicle, but rather can be partially operated on the ground. Nevertheless, the aerial vehicle is preferably provided with a suitable control computer and a suitable attitude controller. Furthermore, the aerial vehicle preferably has the sensors which are customary in contemporary multicopters, for example gyroscopic sensors, a magnetometer and/or acceleration sensors for rotation stabilization and position stabilization and/or a barometer for height measurement and also GPS.

Furthermore, distance sensors can be expedient, which distance sensors are oriented horizontally and/or in the direction of the applicator in order to precisely detect, during the dispensing process, the distance from the area which is to be coated. A constant distance from the surface which is to be coated which is required for ideal dispensing can be achieved in this way.

The aerial vehicle carries the coating liquid, which is to be applied, with it in the tank. Since the contents of the tank are not usually sufficient in order to completely provide larger objects with the desired coating, according to the invention the aerial vehicle is designed, in a particular manner, to receive new coating liquid.

This can be implemented in such a way that the tank is permanently fastened to the aerial vehicle and the aerial vehicle has a filling opening by means of which the tank can be refilled in the landed state of the aerial vehicle. In the case of a design of this kind, the tank itself usually remains on the aerial vehicle, even if it can additionally be designed in a removable or exchangeable manner. Said tank can be refilled in the fitted state, preferably by means of a filling opening which is provided on the tank and which can be directly accessible when the tank is fitted on the outside of the aerial vehicle. If the filling opening is provided for manual filling, it is preferably located on the top side of the tank with respect to the normal position of the aerial vehicle. If automated filling is intended, it is advantageous when the filling opening is provided laterally or on the bottom side of the tank, so that the opening is easily accessible to an output nozzle, which is on the ground, when the aerial vehicle is landed for the purpose of receiving new liquid.

As an alternative or in addition, provision can be made for the tank to be designed as part of an exchangeable tank module which can be coupled to the fuselage of the aerial vehicle and can be uncoupled from said fuselage by means of a coupling device which can be controlled in an automated manner. Accordingly, provision is made for the tank to be designed as part of an exchangeable tank module which is intentionally replaced for the purpose of re-equipping the aerial vehicle with coating liquid. To this end, component elements of a common coupling device are provided on the fuselage of the aerial vehicle and on the exchangeable tank module, which component elements allow automated exchange.

Similarly to the tank with coating liquid as part of a tank, module of this kind, provision can also be made for the applicator for dispensing the coating liquid to be provided as part of an applicator module of exchangeable configuration on the aerial vehicle.

This allows the applicator to be automatically replaced, for example for different coating requirements, during operation. Therefore, different opening angles of a spray jet which is dispensed by the applicator can be provided for various regions of the same object and can be possible by different applicators. In particular, different applicators can also be used for different coating liquids or paints of the coating liquid which is to be dispensed, so that a cleaning system which is integrated into the aerial vehicle can be dispensed with.

The coupling device, by means of which the applicator module can be coupled to the fuselage of the aerial vehicle, can be designed as a coupling device which can be controlled in an automated manner, just like the coupling device for the above-described tank module.

As an alternative, provision can also be made for a common coupling device to be provided for the tank module and also the applicator module, so that these two modules form a module which can be jointly coupled. This is suitable, in particular, when various coating liquids, for example paints of different colors or a base coat and a lacquer, are intended to be discharged in immediate succession.

The aerial vehicle is provided with a plurality of motors for driving the rotors, wherein said rotors are preferably electric motors. In this case, it is considered to be particularly advantageous when the the aerial vehicle has, for the purpose of supplying energy to the motors, an energy supply module for providing electrical energy. Said energy supply module is preferably an energy supply module with batteries or rechargeable batteries. However, any other techniques, such as the configuration with a fuel cell in particular, are also possible in principle.

Since it is often necessary to clean the surface which is to be painted before a painting process, it may be advantageous for an exchangeable module for outputting cleaning liquid and solvent to also be provided. Furthermore, an exchangeable module with a sandblasting device is also expedient in order to prepare a surface which is to be painted. Said modules can preferably be coupled and uncoupled by means of a coupling device which can be controlled in an automated manner. In this case, the coupling device is preferably identical to that of the combined tank and applicator module, so that the aerial vehicle can be selectively switched to a configuration for preparing the surface and for coating the surface.

Said energy supply module can preferably likewise be coupled to the fuselage of the aerial vehicle and decoupled from said fuselage by means of a coupling device which can be controlled in an automated manner. Therefore, said energy supply module can also be replaced in an automated manner in the landed state of the aerial vehicle.

However, it should be noted here that it is considered to be advantageous when the aerial vehicle is also supplied with power during exchange of the energy supply module, even if it appears to be conceivable, in principle, to restart the control electronics of the aerial vehicle only after coupling a new energy supply module. In order to ensure a continuous power supply, various options are advantageous. For example, the aerial vehicle can be provided with an additional power store in order to bridge the replacement of the energy supply module. Furthermore, it is also possible to equip the aerial vehicle with two or more energy supply modules which are designed as exchangeable modules, so that one can remain coupled while another is replaced in an automated manner. As an alternative, it is also possible to supply the landed aerial vehicle with power from a base station during replacement of the energy supply module. In the case of a design of this kind, provision is preferably made for the aerial vehicle to have downwardly facing contact areas, with contact areas on the base station being provided in a corresponding manner to said downwardly facing contact areas, so that the power supply is ensured solely by landing the aerial vehicle and optionally subsequent positioning.

It is particularly advantageous when the energy supply module is designed together with the exchangeable tank module as an integral tank and energy supply module. This allows the aerial vehicle to be equipped with a tank filled with coating liquid on the one hand and a filled energy supply on the other hand by replacement of a single module. In particular, the volume of the tank and the storage capacity of the energy supply can be matched to one another here, so that, on the basis of the typical consumption, the tank and the energy supply are emptied at approximately the same time.

Even in the case of a refinement in which the applicator module and the tank module are designed in the above-described manner as a module which can be jointly coupled, this common module can additionally be configured as an energy supply module.

Even though an electric drive is currently considered to be advantageous, a refinement in which the aerial vehicle has at least one internal combustion engine for driving the rotors or for driving a generator for generating electrical energy is also possible in principle. The advantage of a refinement of this kind is the higher energy density of fuel in relation to customary batteries and rechargeable batteries.

In the case of a design of this kind, the fuel supply can take place analogously to the options for the configuration of the tank, that is to say by means of a fuel module for supplying the internal combustion engine with fuel, which fuel module either can be coupled to the fuselage of the aerial vehicle and/or decoupled from said fuselage by means of a coupling device, which can be controlled in an automated manner, or remains permanently on the aerial vehicle, wherein the aerial vehicle has a filling opening by means of which the the fuel module can be refilled in the landed state of the aerial vehicle.

As described, the various modules, which can be designed as separate or partially or completely combined modules, can be coupled to the fuselage of the aerial vehicle by means of a coupling device which can preferably be controlled in an automated manner.

The coupling devices, by means of which the applicator module, the tank module, the energy supply module or else other modules which are fitted with consumables or exchangeable components are exchanged depending on the configuration, is preferably designed for automated disconnection and/or coupling. As a result, it is possible to implement a largely autonomous coating system which does not require any or only little human intervention while fulfilling its tasks.

Due to automated disconnection, a module which was previously coupled to the fuselage after landing of the aerial vehicle can be released, so that said module can then be replaced by another module. The release can be performed by an actuator of the aerial vehicle itself or by an actuator of a base station. A combination is also possible, in the case of which application of force to a component of the coupling device on the side of the aerial vehicle by an aerial vehicle-external section is required, so that the coupling device can be moved from a coupling state to a release state. In the case of a design of this kind, an actuator of the aerial vehicle, which actuator is provided for releasing the coupling device, is able to do so only in the landed state of the aerial vehicle since this is mechanically prevented until engagement of the aerial vehicle-external section. Owing to a design of this kind, the loss of a module during flight due to a software error or an operating error is prevented.

A second aspect of the invention likewise proposes a coating system, wherein this coating system preferably also has some or all of the features according to the above-described first aspect of the invention. According to the second aspect, the following features are characteristic of a coating system according to the invention.

The coating system has a tank for holding coating liquid before it is applied. Said coating system further has an applicator for dispensing the coating liquid, through which applicator coating liquid which is supplied from the tank is output onto a surface which is to be coated, wherein, in accordance with the above-described coating system, the coating system comprises an unmanned aerial vehicle in the form of a helicopter for outputting the coating liquid and a fuselage and at least two rotors, wherein the tank and the applicator are provided on this aerial vehicle.

In this case, provision is made for said applicator to be provided with a guide device in order to in this way reduce disturbance of a coating spray jet, which is dispensed by the applicator, on account of turbulence which is caused by the rotors. The inventive special feature according to the second aspect of the invention is that a guide device prevents the turbulence which occurs at the rotors having an excessively negative influence on the spray jet.

In the simplest case, said guide device may be a guide plate which shields those rotors which are arranged on the same side as the applicator from the applicator. A guide plate of this kind, which preferably at least has a size of 200 $cm^2$, is preferably arranged directly adjacent to an outlet of the applicator.

It is particularly advantageous when the guide device is designed in the form of a structure which surrounds a dispensing axis of the applicator, wherein said structure is preferably a structure which widens in the dispensing direction and is in the form of a funnel which opens in the dispensing direction.

Due to shaping of this kind, the discharged spray jet is largely completely insulated from disturbing air movements. Since air movements of this kind can be caused in ways other than by the rotors and, in particular, are common when the aerial vehicle is used at great heights, extensive insulation of this kind is advantageous. The widening structure is preferably designed as a lightweight plastic part. The cross-sectional area of this structure is preferably at least 100 $cm^2$ on the outlet side.

In this case, the widening structure is preferably arranged with respect to the aerial vehicle on the whole in such a way that a distal end of this structure can be guided approximately up to the surface to be coated, without the rotors or other parts of the aerial vehicle being at risk of collision with respect to the surface.

Said applicator of an aerial vehicle according to the first or the second aspect of the invention is preferably designed such that it can be displaced in relation to the fuselage of the aerial vehicle. Said applicator can be designed such that it can be moved in a pivotable manner in relation to a fuselage of the aerial vehicle in particular, wherein in particular preferably the applicator can move in a pivoting manner about a horizontal pivot axis, preferably about an angle of at least 60°, particularly preferably of at least 80°, so that the applicator can be pivoted downward substantially between a first orientation for approximately horizontally outputting a spray jet and a second orientation for approximately vertically outputting a spray jet.

A motor is provided for displacing the applicator in relation to the fuselage, which motor can therefore change the orientation of the applicator during flight. In the case of vertical extended surfaces, the applicator is preferably oriented substantially horizontally, that is to say oriented to dispense a roughly horizontal spray jet. Due to the pivotability, said applicator can, in contrast, be pivoted downward, so that the aerial vehicle can also coat surfaces which are arranged under the aerial vehicle. Ideally, the applicator can be pivoted until it has a vertical orientation in which the coating liquid is dispensed vertically downward.

In the case of the refinement with a guide device, which is associated with the applicator, for averting turbulence from spray jets, it is advantageous when this guide device is provided in a stationary manner in relation to the applicator and therefore can be displaced in relation to the fuselage and the rotors of the aerial vehicle together with said applicator.

The applicator can preferably be pivoted about only one pivot axis in order to be able to output coating liquid forward and downward in the manner explained above. Further degrees of freedom are possible but are generally not required on account of the ability of the aerial vehicle to move in the air.

The aerial vehicle is preferably designed with a layer thickness sensor unit for contactlessly measuring an applied layer of paint, wherein this layer thickness sensor unit is either integrated fixedly in the fuselage of the aerial vehicle or is coupled in an exchangeable manner as an exchangeable module. As a result, the aerial vehicle is automatically able to identify whether the desired layer thickness has already been reached. A measurement of this kind can be made, in particular, using the measurement principle of ultrasonic testing, laser measurement or infrared measurement.

Furthermore, it is advantageous when the aerial vehicle has at least one camera. A camera of this kind can likewise be used in the case of non-transparent coating liquids in order to examine the applied layer, in particular in order to ascertain further coating requirements.

On account of the customary dispensing direction in the horizontal direction, the camera is preferably likewise oriented horizontally. However, it can also be pivoted together with the applicator or independently of said applicator.

In the case of a preferred design, the camera can in particular also serve for position control of the aerial vehicle, in particular during dispensing of coating liquid. Due to analysis of the camera image of the target area which is recorded from a short distance, the attitude control of the aerial vehicle can allow the liquid to be dispensed very precisely in terms of location.

When the layer thickness sensor unit is part of an exchangeable sensor module which can be coupled to the fuselage of the aerial vehicle and/or can be uncoupled from said fuselage by means of a coupling device which can be controlled in an automated manner, this allows this module to not be kept permanently coupled to the aerial vehicle. This is advantageous particularly when the module is coupled to the aerial vehicle by means of a coupling device which corresponds to that of the tank module or of the applicator module, so that it is possible to switch between them.

Dispensing of coating liquid causes recoil. The attitude controller is designed to compensate for this in order to allow a substantially constant distance between the aerial vehicle and the area which is to be coated. In the case of only a small pulse, it is sufficient when the abovementioned rotors which are responsible for lifting compensate for this pulse by different rotation speeds of the rotors. However, it is advantageous when the aerial vehicle has a separate application compensator for compensation.

Various designs of compensation devices are possible here, wherein provision is made in each case for these compensation devices to be designed for only temporary activation in order to achieve a compensating opposing application of force only during dispensing of liquid.

The use of an application compensator in the form of an additional rotor, the rotation axis of which has an orientation which differs from a vertical direction, is particularly advantageous. In accordance with the preferred horizontal dispensing direction, this rotor is provided with a preferably likewise horizontal rotation axis. When a pivotable applicator is used, the rotation axis of the rotor can preferably be pivoted together with the applicator.

In the case of an alternative design, the application compensator comprises a guide device which can be displaced, in particular can be pivoted, in relation to the fuselage and which, by relative displacement in relation to the air stream of at least one of the rotors, deflects the air stream flowing to the rotor or the air stream departing from the rotor for the purpose of generating a counterpulse.

The aerial vehicle preferably has a measurement system for measuring the quantity of liquid dispensed from the tank or the quantity of liquid still contained in the tank. Since a high proportion of the load of the aerial vehicle is preferably formed by the contents of the tank, it is advantageous when the data relating to the quantity of fluid still present or already dispensed is also used for attitude control by the control computer.

The coating system can be formed, in principle, solely by the aerial vehicle. After manual configuration of the aerial vehicle on the ground and optionally in a manner controlled by remote control, said aerial vehicle can start for the intended coating task.

However, it is advantageous when the coating system has a base station which serves as a starting and landing area for the aerial vehicle. This base station has a defined landing area for the aerial vehicle, which landing area can be designed in different ways in order to allow supply to the aerial vehicle after landing.

For the purpose of moving the aerial vehicle to a defined service position with accurate positioning during the course of landing, the base station preferably has a mechanically acting positioning mechanism. Said mechanism is an active mechanism having at least one electrically operated actuator which is designed for displacing the aerial vehicle after landing. This can be performed in the manner of a gripper or slide.

The positioning mechanism is preferably designed as a passive positioning mechanism and has guide areas, which are inclined in relation to a vertical direction, for horizontally displacing the aerial vehicle during landing. In the case of this design, the base station captures the aerial vehicle as it were. The aerial vehicle has defined sections which are arranged in such a way that they assume a defined position at the end of the landing process by sliding on the guide areas in an intended manner.

Since the coupling process for coupling the abovementioned modules can cause an application of force to the aerial vehicle, the base station and the aerial vehicle preferably have a fixing mechanism by means of which the aerial vehicle can be secured against vertical displacement in the landed state as a result of an application of force of this kind. This fixing mechanism preferably has, in particular on sides of the base station, at least one displaceable securing element which can be made to engage with a mating area on the aerial vehicle for the purpose of securing the aerial vehicle, so that the aerial vehicle is held in an interlocking or force-fitting manner.

Various designs are provided here. For example, the said securing element can be provided as a translatively or pivotable securing element. After or during landing of the aerial vehicle, said securing element is moved up to or pivoted up to said aerial vehicle or to landing gears thereof and fixes them in an interlocking or force-fitting manner.

A particularly high degree of stability, which is beneficial for exchanging exchangeable modules, can be achieved by way of the securing element being provided with a thread, in particular an internal thread. A thread, preferably an external thread, which is provided on the landing gears in particular, is also provided on the aerial vehicle in order to interact with said thread on the securing element. By turning the thread on the base station, the aerial vehicle and the base station can be screwed together after landing as it were, so that the aerial vehicle itself remains fixed in location to the base even when heavily loaded. This type of securing is also suitable, in particular, in order to secure the aerial vehicle to the base station in strong winds.

A fixing mechanism which has interacting inclined areas on the aerial vehicle and on the securing element is also advantageous. As a result, the aerial vehicle can be pushed down transversely to the displacement direction when the securing element is displaced and in this way be pressed against the base station.

A fixing mechanism with a plurality of securing elements on the base station, which securing elements can secure the aerial vehicle in an interlocking manner, and which can be displaced in a limited manner in order to secure the aerial vehicle in an interlocking manner in a locking position is likewise possible. A common locking member is provided for jointly displacing this securing element in a different direction and therefore in the direction of its respective locking position.

The base station serves, in particular, to exchange modules of the aerial vehicle for modules of the same type in an automated manner. It can also be possible to exchange modules which are only occasionally required, for example an applicator module and a sensor module which are used in different phases, on the base station in an automated manner.

In order to ensure that the modules are not decoupled by a malfunction in the abovementioned manner during flight, at least one section is preferably provided on the base station, which section, when the aerial vehicle is landed, interacts with at least one coupling device in such a way that said coupling device can be moved from the coupling state to the release state.

Owing to the mechanical interaction of this base station-side section and the coupling device on the aerial vehicle, it is possible to then implement decoupling using the control computer. In the case of this preferred design, this would be mechanically suppressed in the air.

If a tank module or a fuel module are provided with an appropriate opening for refilling, the base station preferably has a corresponding connection nozzle for automated filling. In order to recharge the battery and/or to operate the aerial vehicle-side control computer, the aerial vehicle is preferably connected to the power supply of the base station in the landed state by electrical contact areas which are correspondingly positioned for this purpose.

The base station preferably has a plurality of exchangeable modules which can be moved to a transfer position, from which they can be coupled to the fuselage of the aerial vehicle, by an automated handling mechanism. These modules can be designed as tank modules for the coating material, battery modules or applicator modules or combinations thereof. These modules are mounted on the base station in a magazine which can preferably be displaced as a whole, for example in the form of a turret magazine.

The base station can preferably have a heating mechanism in order to keep the coating material at a temperature which is suitable for application. In this way, the energy requirement of the aerial vehicle, which energy requirement is possibly required for the necessary heating, is reduced after starting. Nevertheless, the aerial vehicle can also have a heating element for heating the carried-along coating liquid.

BRIEF DESCRIPTION OF THE DRAWINGS

Further advantages and aspects of the invention can be found in the claims and the following description of preferred exemplary embodiments of the invention which are explained below with reference to the figures.

DETAILED DESCRIPTION OF THE EXEMPLARY EMBODIMENTS

Figure 1:
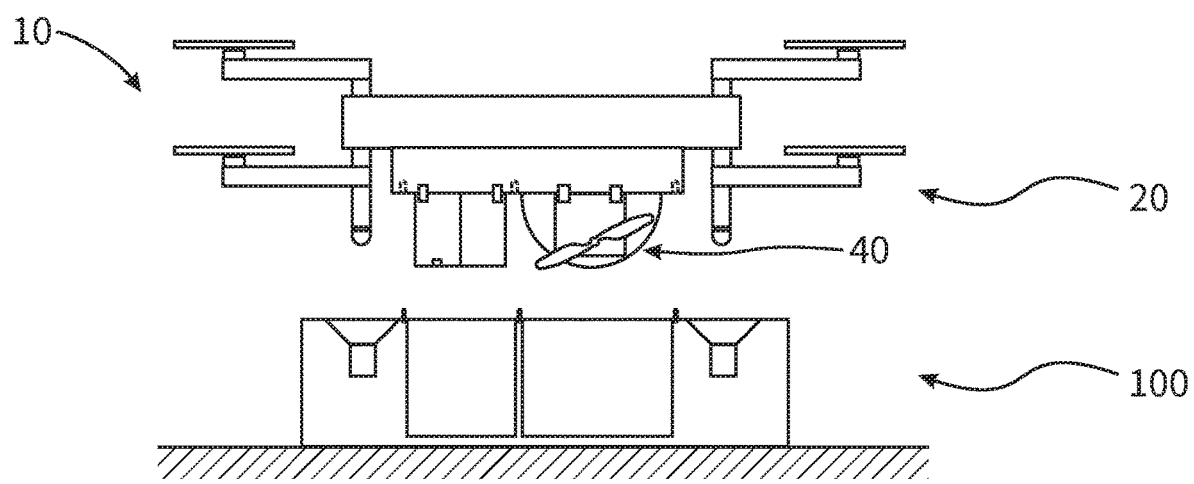
FIG. 1 shows an exemplary embodiment of a coating system according to the invention having a base station and an aerial vehicle.

FIG. 1 shows a coating system 10 according to the invention. This coating system has an aerial vehicle 20 on which an applicator module 40 is provided. The coating system 10 further has a base station 100 which is intended to be set up in a stationary or mobile manner on the ground and also serves as a landing platform for the aerial vehicle 20.

Figure 2:
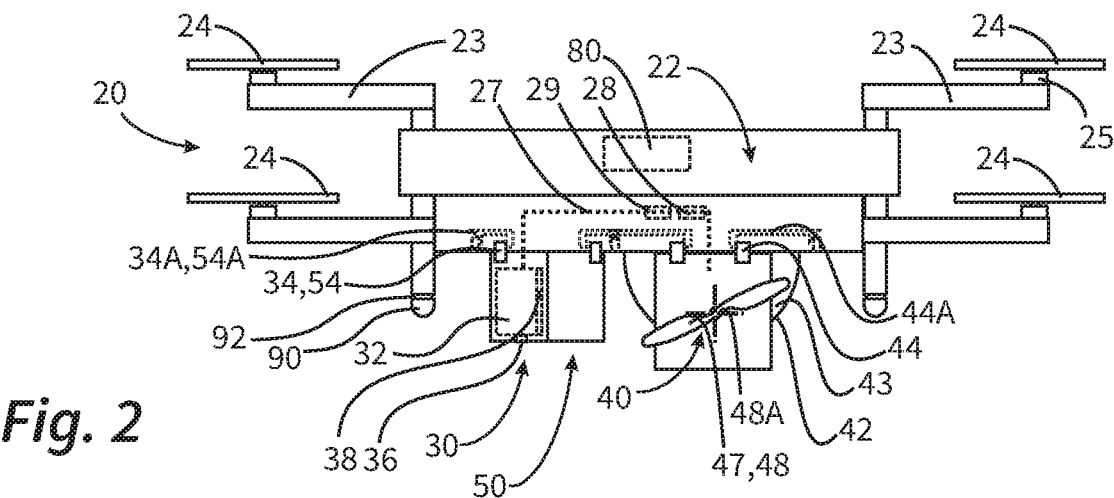
FIGS. 2 to 4 show the aerial vehicle of the coating system from above and also from two lateral perspectives.
Figure 3:
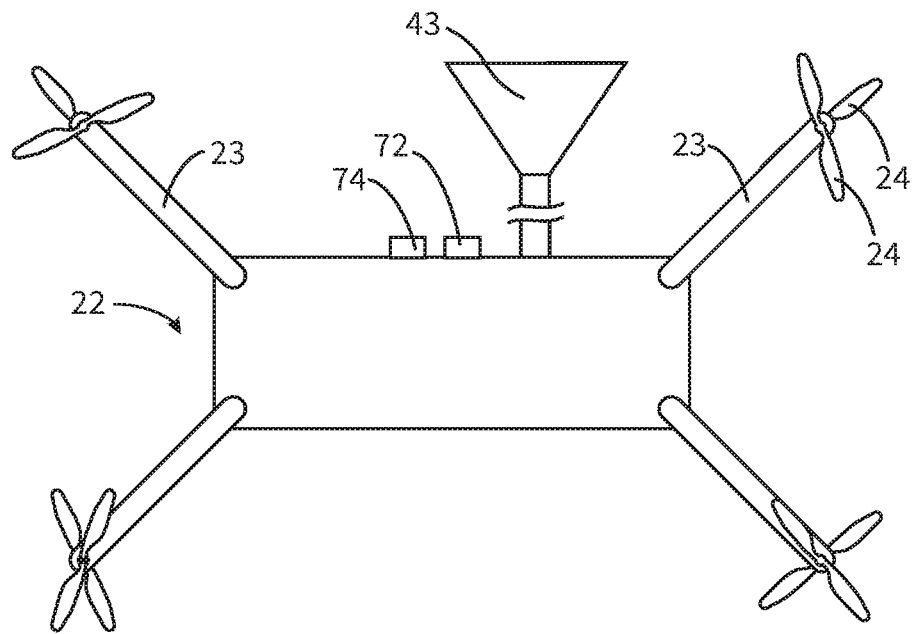
Figure 4:
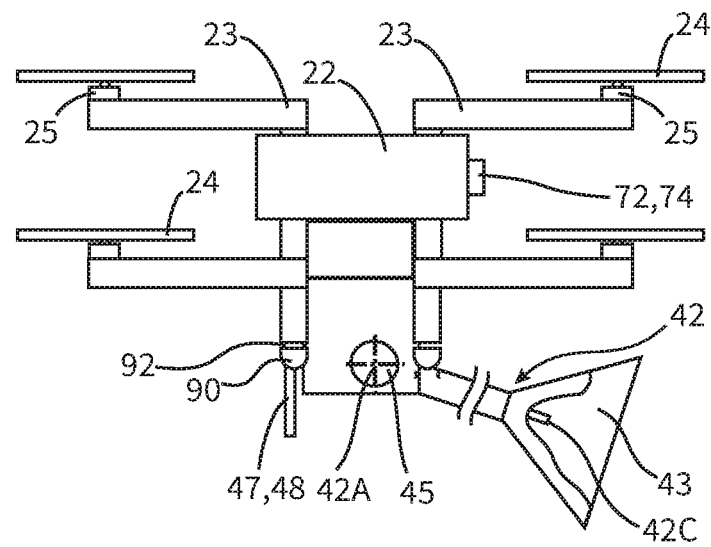

The components of the aerial vehicle 20 are explained in more detail in a schematic manner with reference to FIGS. 2 to 4.

The aerial vehicle is designed as an octocopter. This means that the aerial vehicle has a total of eight rotors which, in a manner driven by respectively dedicated electric motors 25 and fitted to cantilever arms 23, implement lifting of the aerial vehicle 20, which lifting is required for flight. The aerial vehicle 20 has a fuselage to which, in addition to the cantilever arms 23 on the bottom side, various modules which will be explained in more detail below are fitted.

Furthermore, the aerial vehicle 20 has a total of four landing feet 90.

Depending on the configuration of the aerial vehicle, said modules are a tank module 30 for holding the coating liquid, an energy supply module 50 for holding batteries or rechargeable batteries, an applicator module 40 for dispensing the coating fluid and, but not in the exemplary embodiment illustrated in FIGS. 2 to 4, a fuel module 60 for supplying an internal combustion engine of the aerial vehicle 20.

In the configuration according to FIGS. 2 to 4, a common module 30, 50 is provided, which common module combines the tank module 30 for the coating liquid and the energy supply module 50 for holding electrically stored energy. This common module 30, 50 is coupled to the fuselage 22 in an exchangeable manner by means of coupling devices 34, 54. The tank module 30 comprises the tank for holding the coating liquid, a measurement system 38 for detecting the filling level and also a filling opening 36 which is usually closed by a non-return valve. The applicator module 40, which is usually designed to be longer than as depicted in the illustrations, comprises the actual applicator 42 for outputting the liquid, which applicator has a dispensing opening 42C for this purpose. The applicator 42 is surrounded by a funnel-like guide device 43 which is oriented in a manner corresponding to the opening angle of the liquid jet which is output by the dispensing opening 42C. The applicator module 40 further comprises a motor 45, for example a servomotor, in order to be able to pivot the applicator 42 about the axis 42A.

An application compensator 47 in the form of a further rotor 48 is provided on that side of the applicator module 40 which is averted from the applicator.

As illustrated in FIG. 2, a connecting line 27 is provided, which connecting line connects the tank 32 to the applicator module 40 and is provided for feeding the applicator 42. The line is provided with a pumping device 29 and a heating device 28. The heating device allows the liquid which is pumped out of the tank 32 by means of the pumping device 29 to be heated before it is dispensed. This is provided depending on the type of coating liquid which is to be dispensed and/or depending on the ambient temperature.

The aerial vehicle 20 is provided for coating surfaces of large area, wherein different types of coating are possible, for example applying a colored paint, a base coat or else applying a corrosion-protection agent or corrosion-protection wax.

Figure 5A:
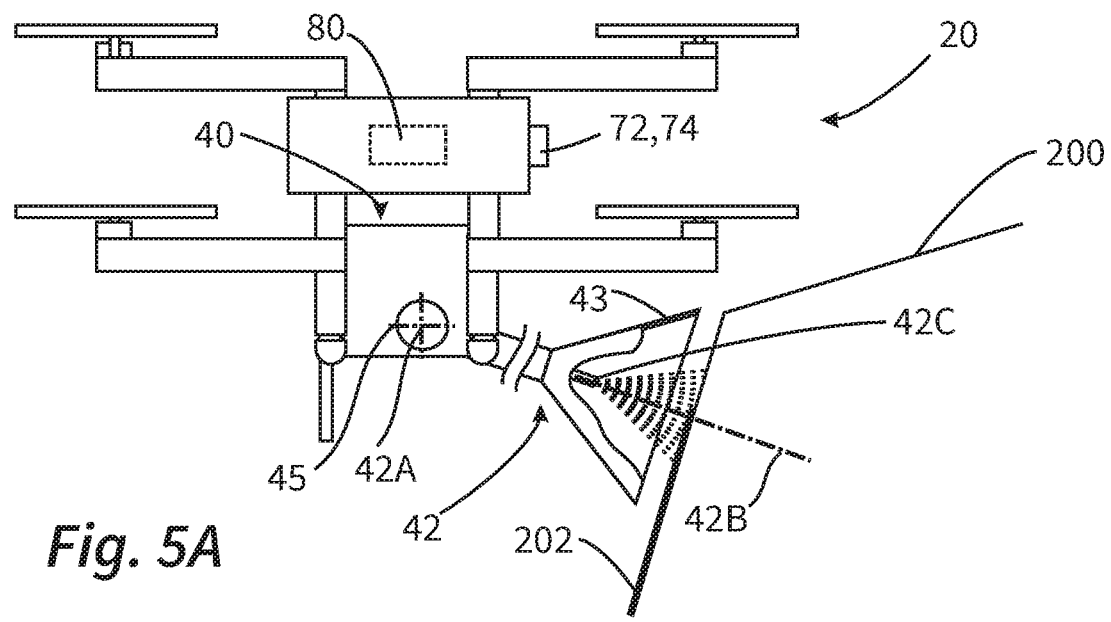
FIGS. 5A and 5B show the aerial vehicle during coating of an object.
Figure 5B:
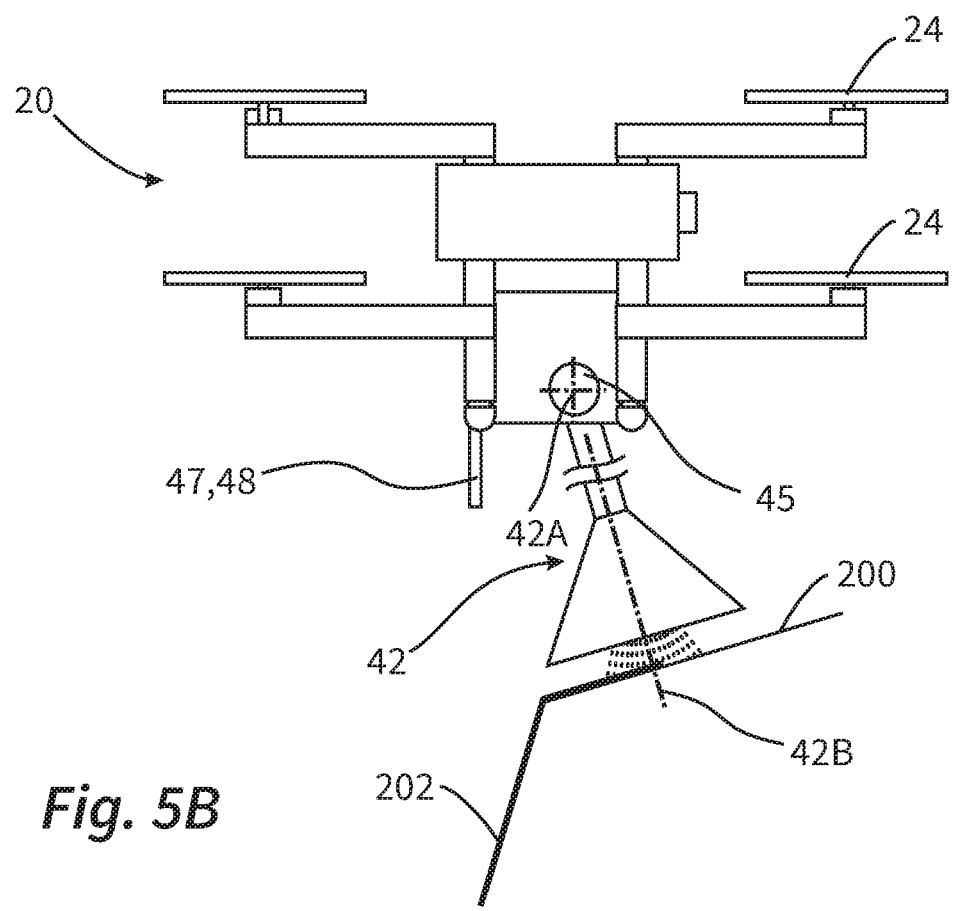
Figure 6A:
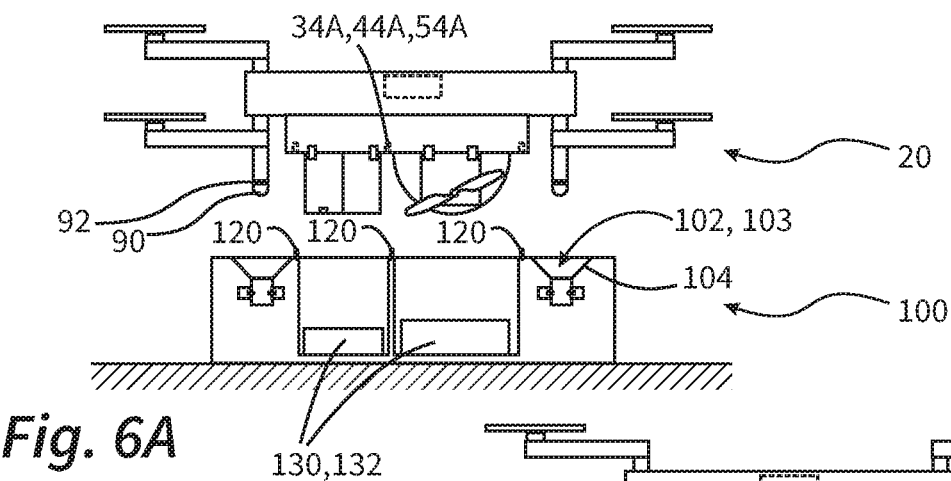
FIGS. 6A to 6E show the coating system including the base station during landing and starting of the aerial vehicle.
Figure 6B:
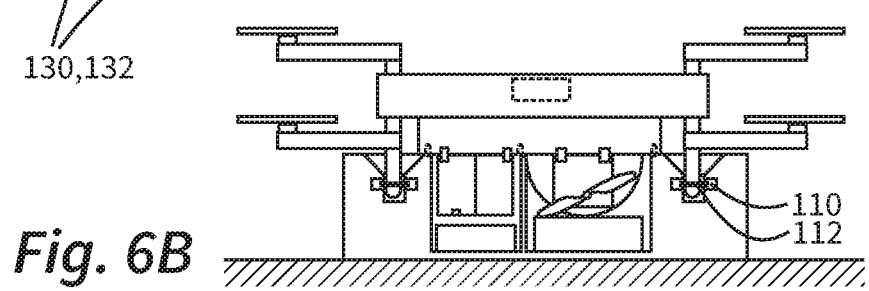
Figure 6C:
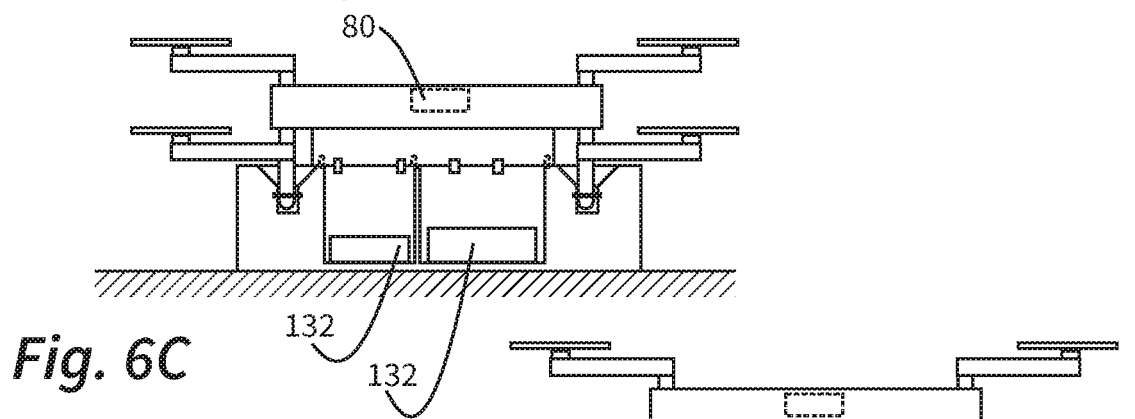
Figure 6D:
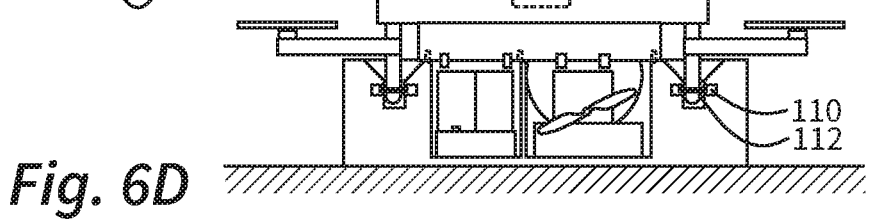
Figure 6E:
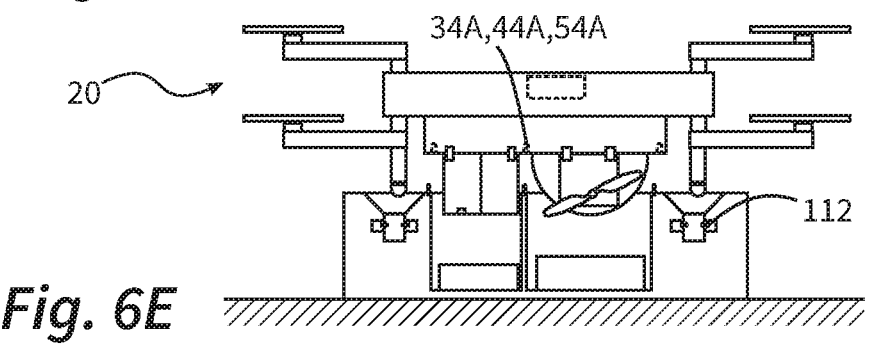
Figure 7:
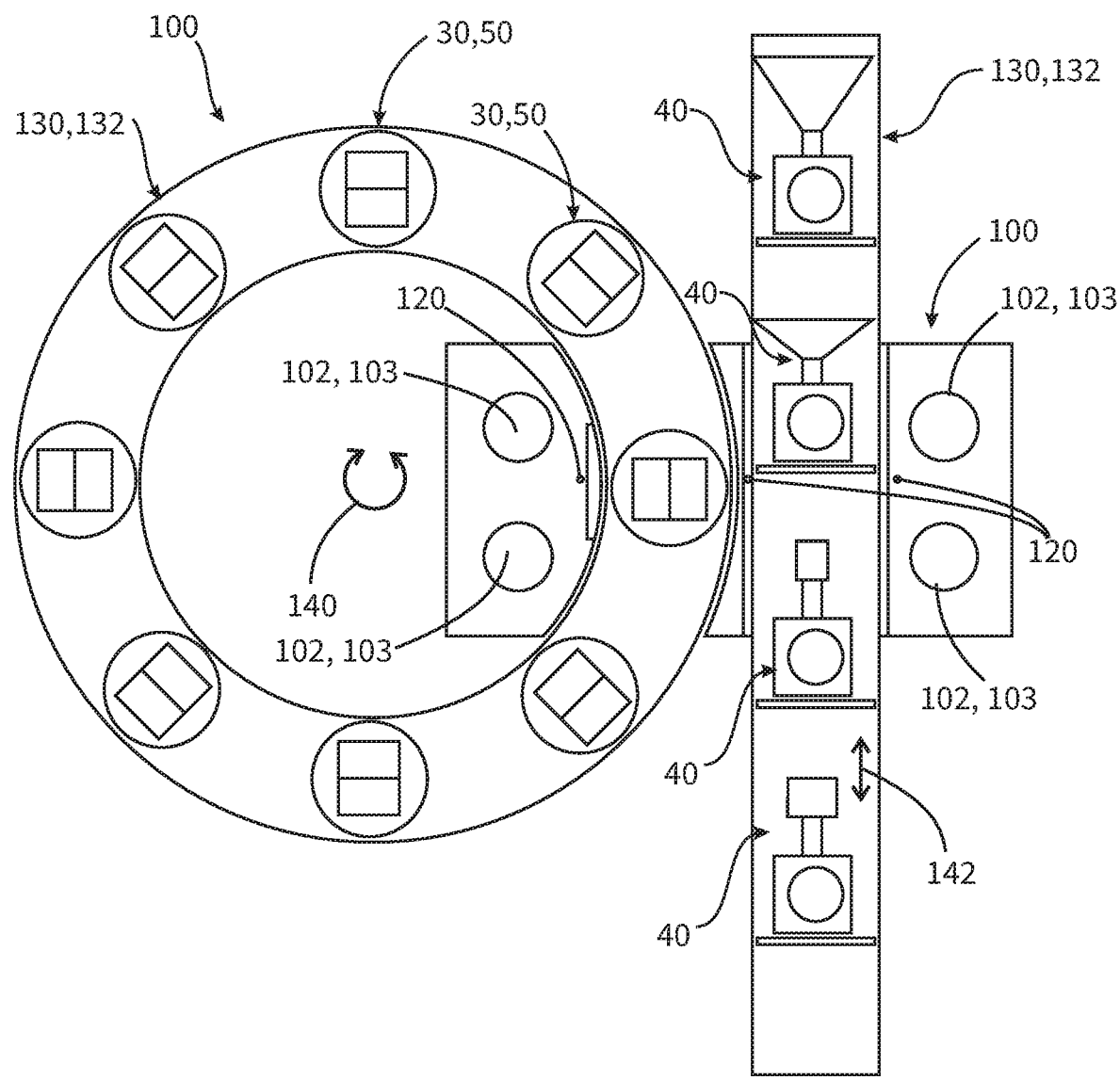
FIG. 7 shows an exemplary refinement of a base station from above.
Figure 8A:
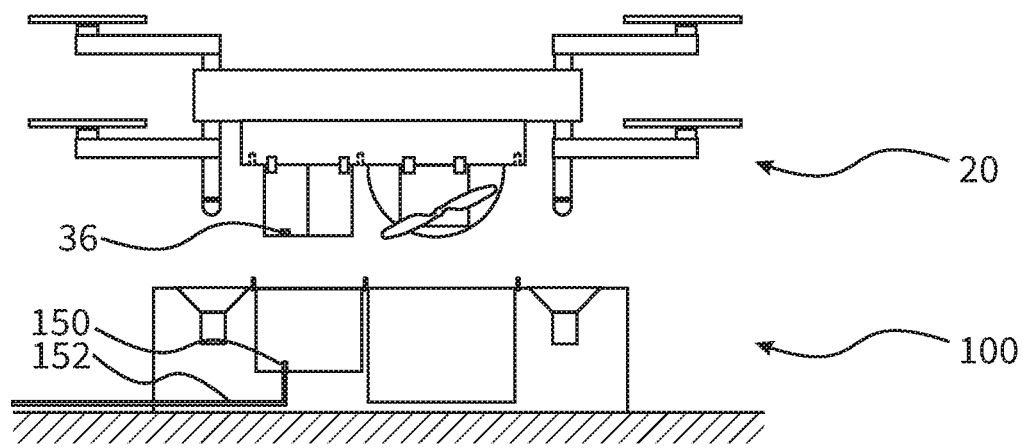
FIGS. 8A and 8B show an alternative design of the coating system.
Figure 8B:
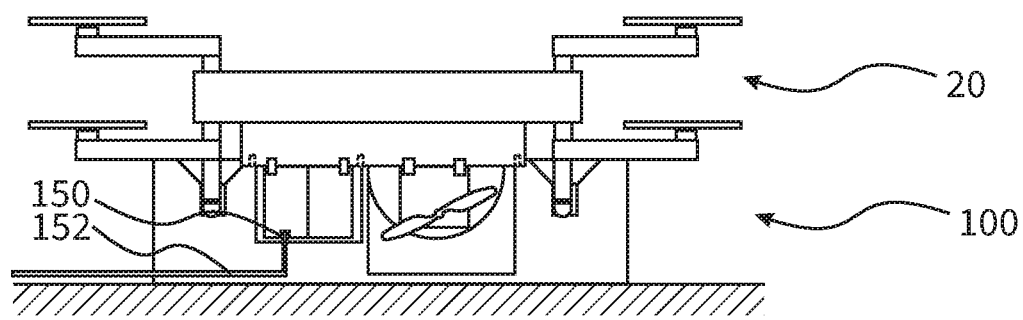
Figure 9:
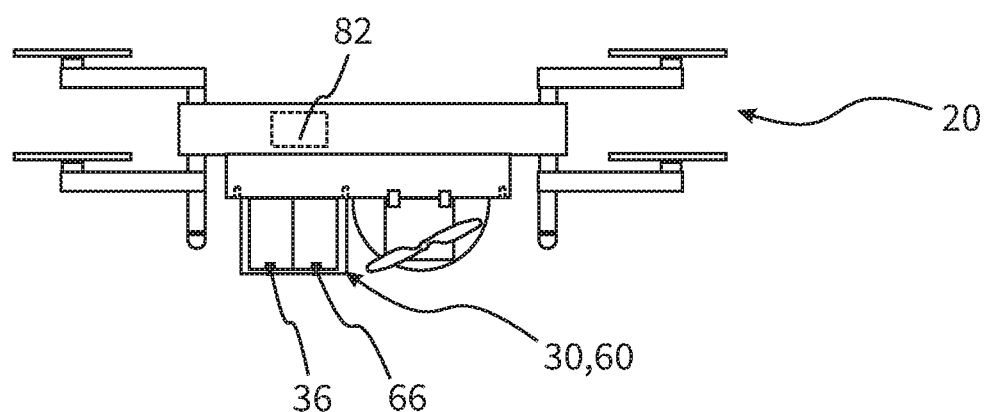
FIG. 9 shows a further alternative design of the coating system.
Figure 10A:
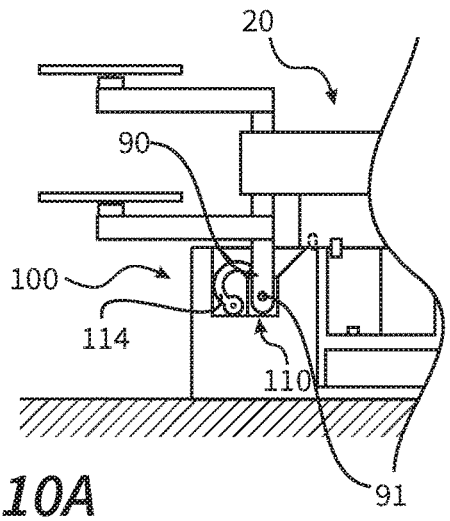
FIGS. 10A to 13C show four variants of a locking system for the base station.
Figure 10B:
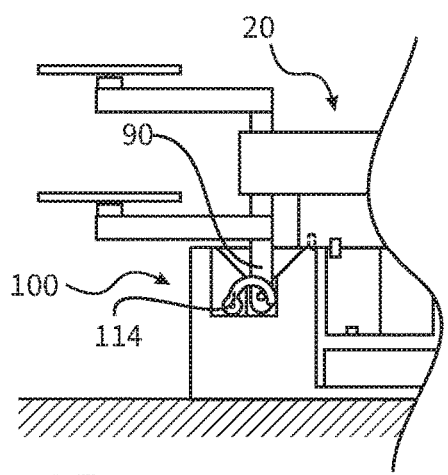
Figure 11A:
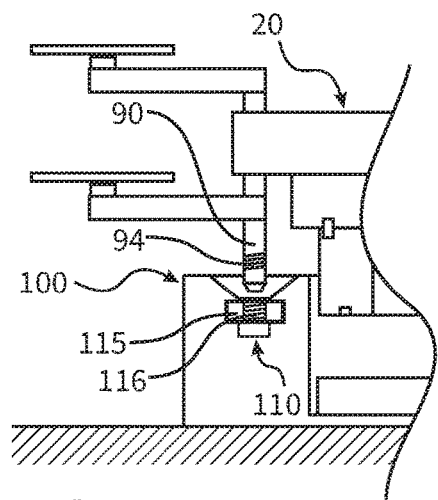
Figure 11B:
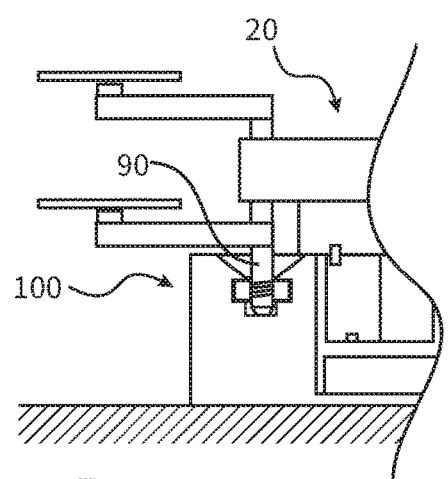

The use of the aerial vehicle 20 takes place as explained, by way of example, with reference to FIGS. 5A and 5B. FIG. 5A illustrates how the aerial vehicle 20 coats a surface 200, that is to say for example applies a layer of paint 202, using the applicator module 40. To this end, the liquid which is supplied from the tank 32 by means of the pumping device 29 is dispensed through the dispensing opening 42C in atomized form in the direction of the dispensing axis 42B. In this case, the guide device 43 in the form of a funnel prevents the air movement which is caused by the rotors 24 from appreciably disturbing the spray jet. Precise coating is possible in this way.

The aerial vehicle 20 has a camera 74 and a layer thickness sensor unit 72. A control device 80 can use the output signals from said camera and layer thickness sensor unit during the discharge of the coating liquid in order to check whether the applied layer meets the requirements or in order to be able to navigate in a particularly precise manner by evaluating a camera image.

Figure 12A:
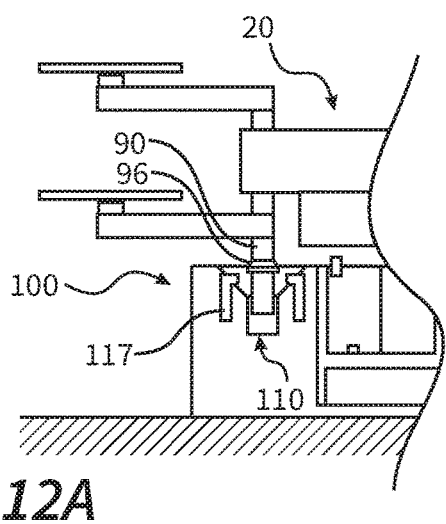
Figure 12B:
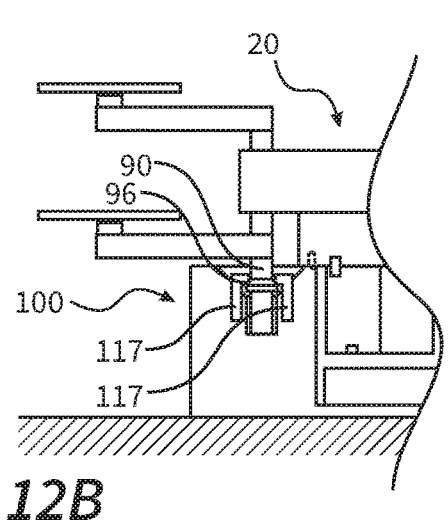

During dispensing of the coating liquid, the rotor 48 is activated in order to compensate for the pulse which is caused by the dispensing operation. Although this is also possible with the lifting rotors 24 in principle, the aerial vehicle 20 would have to be moved to a more tilted position, which would make dispensing of liquid more difficult.

FIG. 5B shows that, with a changed orientation of the surface 200 which is to be coated, the aerial vehicle 20 ensures, due to reorientation of the applicator 42, that the application of the coating continues at an ideal angle and in a manner protected against the turbulent air of the rotors 24.

FIGS. 6A to 6E show temporary landing of the aerial vehicle 20 for the purpose of refreshing the operating resources.

FIG. 6A shows the aerial vehicle 20 during the landing approach. Owing to a downwardly directed camera, not illustrated, or else other navigation and positioning mechanisms, the aerial vehicle 20 positions itself above the base station 100 and then reduces the altitude. In the process, the landing feet 90 engage with a positioning mechanism 102, which is shaped in the form of a funnel, as intended. The guide faces 104, which form the funnel, are correspondingly inclined so that a precise predetermined position can be assumed even in the event of an inaccurate approach by the aerial vehicle 20 in the manner shown by FIG. 6B.

During landing, the modules 30, 50, 40 enter shafts which are provided on the base station 100, and said modules are then arranged above magazines 132 which are still to be explained below. As soon as the landing feet 90 of the aerial vehicle 20 have reached their desired position, pin-like securing elements 112 of a fixing mechanism 110 are radially extended in order to completely fix the aerial vehicle 20 by way of interaction with mating areas 92 on the landing feet 90, so that said aerial vehicle is secured against lifting away in an interlocking manner.

In a manner not illustrated in any detail, electrical contact areas on the base station 100 and the aerial vehicle 20 are connected to one another during landing, so that the control device 80 of the aerial vehicle 20 can be supplied with electrical power by means of said contact areas.

Furthermore, the landing process leads to pin-like sections 120 which are provided on the top side of the base station coming into contact with components 34A, 44A, 54A of the coupling devices 34, 44, 54 which are provided for this purpose and in this way allow the modules 30, 50, 40 to be uncoupled in a mechanical manner. As a result, it is possible for the control device 80 or a base station-side control device to release the coupling devices 34, 44, 54, so that both the combined tank module and energy supply module 30, 50 and also the applicator module 40 are unlatched and drop into their respective magazine 132.

By moving this magazine 132, a new module 30, 40, 50 is then, in the manner shown in FIG. 6D, respectively moved to a transfer position below the aerial vehicle 20 and raised there by means of a mechanism 130 which is not illustrated in any detail (and instead is shown diagrammatically), so that coupling of the coupling devices 34, 44, 54 takes place. The coupling devices 34, 44, 54 are preferably designed in such a way that a coupled state is achieved solely by pressing against the respective module, in particular by way of the module-side elements of the coupling device locking into place in a unidirectional manner when the fuselage 22 is pressed against.

As illustrated in FIG. 6E, the aerial vehicle 20 can be restarted and continue applying the coating after the securing elements 112 are released.

FIG. 7 shows a schematic illustration of the base station 100 from above. It can be seen that the magazines for holding the combined tank and energy supply modules 30, 50 and, respectively, the applicator modules 40 are configured differently in the present case. The magazine 132 for the combined modules 30, 50 is designed as a turret magazine, whereas the magazine 132 for the applicator modules 40 is designed as a linearly oriented magazine 132. The two magazines 132 share the common feature that they are respectively configured in a movable manner in accordance with the arrows 140, 142.

FIGS. 8A and 8B and also 9 show slightly modified variations. An additional or alternative option for refilling the tank 32 is provided in the case of the design of FIGS. 8A and 8B. Here, the base station 100 has a filling section 150 which is connected into a coating liquid supply system 152. When the aerial vehicle 20 is landed, this section enters the filling opening 36 of the aerial vehicle 20 and in the process opens the non-return valve which is provided here. The tank 32 can then be refilled without exchanging the module.

FIG. 9 shows a variant in which a supplementary or additional internal combustion engine 82 is provided in the drone. Furthermore, a fuel module 60 is provided in this refinement for supplying the internal combustion engine 82, which fuel module is part of an integral module 30, 50 for the coating liquid and the fuel. In this case, filling openings 36, 66 are respectively provided on the bottom side of this module 30, 50 for refilling purposes.

FIGS. 10A and 10B, 11A and 11B, 12A and 12B and also 13A to 13C show alternative variants of a fixing mechanism 110 which can be used instead of those of the design illustrated in FIG. 6B.

In the variant of FIGS. 10A and 10B, the fixing mechanism has pivotable securing elements 114 which are designed in a hook-like manner in the present case. After landing or in the last phase of landing of the aerial vehicle 20, these securing elements project in a motor-driven manner out of the position of FIG. 10A to that of FIG. 10B. In the process, they fix a holding cam 91 which is respectively provided on the landing foot 90. The aerial vehicle 20 is then secured against lifting away in an interlocking manner.

In the variant of FIGS. 11A and 11B, the landing feet 90 are provided with an external thread 94. In a manner corresponding to this, a securing element 115 of the base station 100 is configured in the form of a rotatable nut with an internal thread 116 and provided such that it can be rotated on the base station 100 by a motor. When the aerial vehicle 20 is landed, the landing feet enter, by way of the external thread 94, the bore of the securing element 115 and are firmly screwed here by the rotational movement of said securing element 115.

The variant of FIGS. 12A and 12B makes provision for inclined holding areas or a circumferential conical area 96 to be provided on the landing feet. In order to interact with said holding areas or conical area, the base station has radially displaceable securing elements 117 which can be displaced horizontally in relation to the inserted landing feet of the aerial vehicle 20 by motor and likewise have an inclined holding area, so that said holding areas, as they approach one another and in the direction of the respective landing foot 90, apply force to said landing foot radially inwardly and as a result axially downwardly. The landing feet of the aerial vehicle 20 are pushed against a stop face of the base station 100 in the process, so that secure fixing of the aerial vehicle 20 is achieved.

Figure 13A:
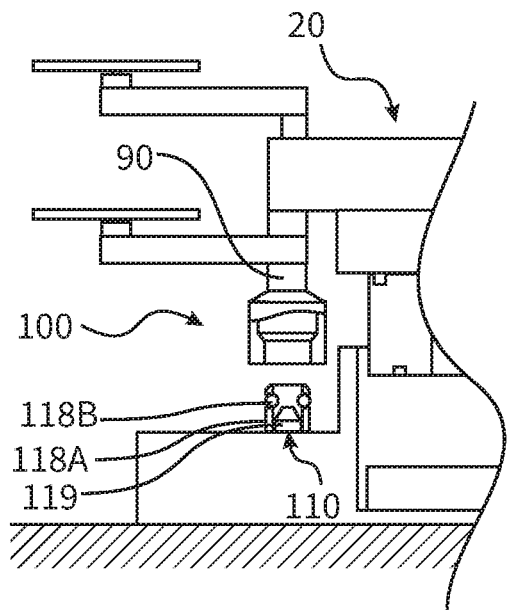
Figure 13B:
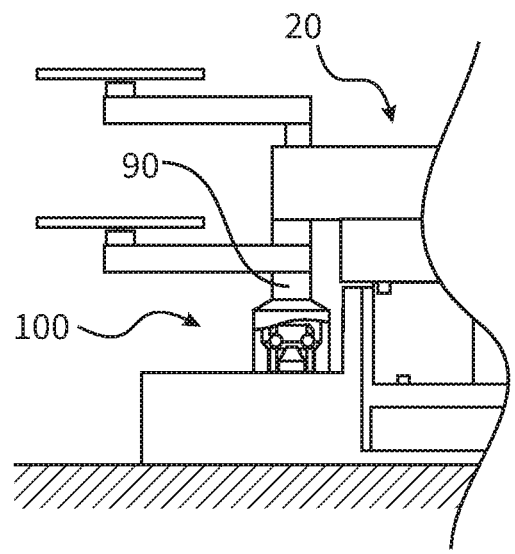
Figure 13C:
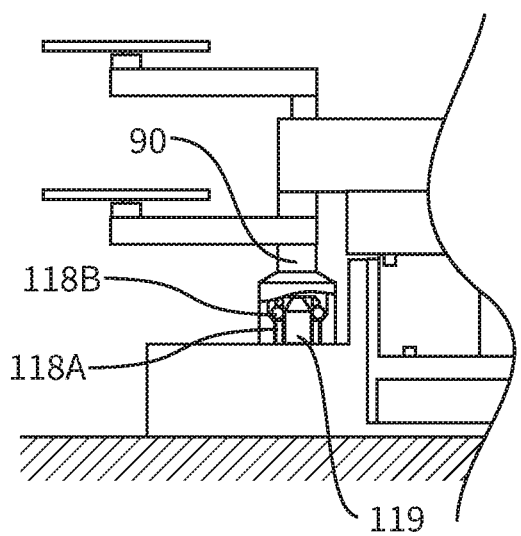

The variants of FIGS. 13A to 13C provide a securing device which, on the base station 100, consists of a pipe 118A, which is provided with radial cutouts, and securing bodies 118B which can be radially displaced in relation to said pipe. A locking pin 119 is provided within the pipe 118A, which locking pin can be displaced in the direction of extent of the pipe 118A by a motor in order to push the securing bodies 118B outward by means of its conical end during this movement.

In a corresponding manner to this, the landing feet 90 are also provided with a widening securing geometry.

When the vehicle 20 is landed, as shown in FIG. 13B, the locking pin 119 is moved upward. In the process, the spherical securing bodies 118B are displaced and shift outward. As a result, they protrude beyond the outside diameter of the pipe 118A on the outside, so that they form an interlocking securing arrangement with the widening geometry of the landing feet 90.

The invention claimed is:

1. A coating system for applying a base coat, a paint, a lacquer or a protective layer to a surface to be coated, said coating system comprising:
   a tank for holding a coating liquid before discharge;
   an applicator for dispensing the coating liquid, the coating liquid being supplied from said tank and output onto the surface to be coated through said applicator;
   an unmanned aerial vehicle comprising a helicopter for outputting the coating liquid to the surface to be coated, said unmanned aerial vehicle comprising a fuselage and at least two rotors;
   a base station comprising a landing area configured for receiving said unmanned aerial vehicle thereon, said unmanned aerial vehicle being in a landed state when disposed on said landing area of said base station; and
   a fixing mechanism cooperating between said base station and said unmanned aerial vehicle, said fixing mechanism being configured to secure said unmanned aerial vehicle against vertical displacement relative to said base station when in the landed state on said landing area thereof;
   wherein said tank is fastened to said unmanned aerial vehicle and is either configured for refilling in the landed state of said unmanned aerial vehicle while said tank is fastened thereto or said tank comprises a tank module configured for releasable coupling to said fuselage to permit exchange of said tank module in the landed state of said unmanned aerial vehicle.

2. The coating system of claim 1, wherein said tank comprises said tank module, said tank module being configured for releasable and automated coupling to said fuselage by a tank module coupling device configured for automated control.

3. The coating system of claim 2, further comprising a coupling arrangement comprising said tank module coupling device and cooperating between said base station and said unmanned aerial vehicle, said coupling arrangement including a section disposed on said base station adjacent said landing area thereof, said section engaging said tank module coupling device in the landed state of said unmanned aerial vehicle to move said tank module coupling device from a coupled state to a released state to permit exchange of said tank module.

4. The coating system of claim 1, wherein said applicator comprises an applicator module having an exchangeable configuration to permit coupling of said applicator module to said fuselage and uncoupling of said applicator module from said fuselage by an applicator module coupling device configured for automated control.

5. The coating system of claim 1, wherein said unmanned aerial vehicle comprises an electrical energy supply module and said coating system comprises an energy supply module coupling device configured for automated control, said electrical energy supply module being configured for coupling to said fuselage and uncoupling from said fuselage by said energy supply module coupling device.

6. The coating system of claim 5, wherein said tank comprises said tank module, said tank module being configured for releasable coupling to said fuselage by a tank module coupling device configured for automated control, said electrical energy supply module and said tank module comprising an integral tank and energy supply module and said tank module coupling device and said energy supply module coupling device comprise a common coupling device.

7. The coating system of claim 1, wherein said unmanned aerial vehicle comprises at least one internal combustion engine for driving said at least two rotors or for driving an electrical energy generator.

8. The coating system of claim 7, wherein said unmanned aerial vehicle comprises a fuel module configured to supply said internal combustion engine with fuel.

9. The coating system of claim 1, wherein said applicator comprises a guide device configured to reduce disturbance, due to turbulence caused by said at least two rotors, of a coating spray jet dispensed from said applicator in a dispensing direction.

10. The coating system of claim 9, wherein said applicator defines a dispensing axis and said guide device surrounds the dispensing axis.

11. The coating system of claim 1, wherein said applicator is pivotably movable relative to said fuselage.

12. The coating system of claim 11, wherein said applicator is pivotably movable about a horizontal pivot axis at an angle permitting downward pivoting of said applicator between a first orientation in which said applicator outputs a substantially horizontally oriented spray jet and a second orientation in which said applicator outputs a substantially vertically oriented spray jet.

13. The coating system of claim 1, wherein said unmanned aerial vehicle comprises a layer thickness sensor unit configured to contactlessly measure an applied layer of coating liquid.

14. The coating system of claim 1, wherein said unmanned aerial vehicle comprises an application compensator configured to compensate for a pulse generated during dispensing of the coating liquid.

15. The coating system of claim 14, wherein said application compensator comprises one of an additional rotor having a rotation axis with an orientation different from a vertical direction, or a guide device displaceable relative to said fuselage and in relation to an air stream of at least one of said at least two rotors to deflect the air stream flowing to or departing from said at least one rotor.

16. The coating system of claim 1, wherein said base station comprises a mechanically-acting positioning mechanism configured to position said unmanned aerial vehicle in a defined service position when in the landed state.

17. The coating system of claim 16, wherein said mechanically-acting positioning system comprises a passive positioning mechanism including guide surfaces inclined in relation to a vertical direction, said guide surfaces interacting with said unmanned aerial vehicle during landing thereof to horizontally displace said unmanned aerial vehicle.

18. The coating system of claim 1, wherein said fixing mechanism comprises at least one securing element configured to cooperate with a mating area on said unmanned aerial vehicle during landing thereof, said at least one securing element being displaceable in an automated manner in a displacement direction into engagement with said mating area to secure said unmanned aerial vehicle against vertical displacement relative to said base station.

19. The coating system of claim 18, wherein said at least one securing element is displaceable translatively or pivotably.

20. The coating system of claim 18, wherein said at least one securing element includes a threaded area configured to cooperate with a threaded area of said mating area of said unmanned aerial vehicle to secure said unmanned aerial vehicle against vertical displacement relative to said base station.

21. The coating system of claim 18, wherein said at least one securing element has an inclined area configured to cooperate with an inclined area of said mating area of said unmanned aerial vehicle such that displacement of said at least one securing element causes a force to be applied to said unmanned aerial vehicle in a direction corresponding to the displacement direction of said securing element and in a direction transverse to the displacement direction.

22. The coating system of claim 18, wherein said fixing mechanism comprises a locking member and said at least one securing element comprises a plurality of said securing elements, wherein relative movement between said locking member and said plurality of securing elements causes simultaneous radial displacement of said plurality of securing elements to secure said unmanned aerial vehicle against vertical displacement relative to said base station.

23. The coating system of claim 1, wherein:
said at least two rotors comprises at least three downwardly-directed rotors; or
said unmanned aerial vehicle comprises a measurement system configured to measure a quantity of liquid dispensed from said tank or a quantity of coating liquid contained in said tank, and an attitude controller including software configured to evaluate measurements taken by said measurement system; or
said tank comprises a thermally-insulated tank with an insulated outer wall; or
said unmanned aerial vehicle comprises a heating device to heat the coating liquid before application thereof by said applicator; or
said applicator has a dispensing opening for outputting the coating liquid to a surrounding area, said applicator being disposed or configured such that said dispensing opening, or a guide device of said applicator, is spaced apart from said at least two rotors by at least 20 cm with respect to a horizontal plane; or
said unmanned aerial vehicle comprises at least one camera oriented horizontally so as to detect surfaces to be coated with the coating liquid and configured to output data for use in positioning said unmanned aerial vehicle relative to the surface to be coated.

24. A coating system for applying a base coat, a paint, a lacquer or a protective layer to a surface to be coated, said coating system comprising:
a tank for holding a coating liquid before discharge;
an applicator for dispensing the coating liquid, the coating liquid being supplied from said tank and output onto the surface to be coated through said applicator;
an unmanned aerial vehicle comprising a helicopter for outputting the coating liquid to the surface to be coated, said unmanned aerial vehicle comprising a fuselage and at least two rotors; and
a base station comprising a landing area configured for receiving said unmanned aerial vehicle thereon, said unmanned aerial vehicle being in a landed state when disposed on said landing area of said base station, said base station comprising a plurality of exchangeable modules including two or more of the following: a tank module incorporating said tank; an electrical energy supply module; a fuel module; or an applicator module incorporating said applicator, each said exchangeable module being movable to a transfer position on said base station, said base station further comprising an automated handling mechanism, and each said exchangeable module in said transfer position on said base station being couplable to said fuselage of said unmanned aerial vehicle by said automated handling mechanism.

25. The coating system of claim 24, wherein said tank is permanently mounted on said unmanned aerial vehicle and said unmanned aerial vehicle or said tank has a filling opening disposed to permit refilling of said tank in the landed state of said unmanned aerial vehicle on said base station.

26. The coating system of claim 24, wherein one of said plurality of exchangeable modules comprises said tank module incorporating said tank.

27. The coating system of claim 24, wherein said automated handling mechanism comprises a movable magazine disposed on said base station, and said plurality of exchangeable modules are disposed in said movable magazine.

28. The coating system of claim 27, wherein said movable magazine comprises a turret.

29. The coating system of claim 24, wherein said base station is configured to heat contents of at least one of said plurality of exchangeable modules.

* * * * *